United States Patent [19]

McKibben

[11] Patent Number: 4,605,071
[45] Date of Patent: Aug. 12, 1986

[54] THERAPEUTIC HORSESHOE
[75] Inventor: David P. McKibben, Gilroy, Calif.
[73] Assignee: Sir Pegasus, Inc., San Jose, Calif.
[21] Appl. No.: 679,202
[22] Filed: Dec. 6, 1984

Related U.S. Application Data

[63] Continuation-in-part of Ser. No. 619,616, Jun. 11, 1984, abandoned.

[51] Int. Cl.$^4$ ................................................. A01L 5/00
[52] U.S. Cl. ..................................................... 168/12
[58] Field of Search .................... 168/4, 12, 13, 14, 24, 168/26

[56] References Cited

U.S. PATENT DOCUMENTS

| | | | |
|---|---|---|---|
| 1,070,507 | 8/1913 | Mercandelli | 168/24 |
| 2,791,280 | 5/1957 | Polioni | 168/24 |
| 3,050,133 | 8/1962 | Ketner et al. | 168/4 |
| 3,288,223 | 11/1966 | Ferguson | 168/12 |
| 4,253,526 | 3/1981 | Alletrux | 168/4 |

Primary Examiner—Robert P. Swiatek
Attorney, Agent, or Firm—Edward B. Gregg

[57] ABSTRACT

The invention is a therapeutic horseshoe (10) including an impact frame (12) for supporting a horse's foot and a cushioned insert (14) for nesting into an insert depression (16) formed in the upper surface (40) of the impact frame such that the insert (14) provides force absorption and kinetic energy return to a ringlike portion of the sole of the foot. The lower surface (50) of the impact frame includes a front slope (62) and a rear slope (64) which improve shock impact and step characteristics in the foot and are important in specifically preventing and alleviating symptoms of laminitis and navicular disease in horses. An alternate toe-in, toe-out shoe (80) is adapted for correction of unbalanced hoof conditions. The therapeutic horseshoe (10) and the toe-in, toe-out shoe (80) are ideal for use by horse professionals such as farriers, veterinarians and trainers. The shoes are also usable on healthy horses as a preventive measure against causes of lameness and as a racing speed enhancement.

6 Claims, 6 Drawing Figures

THERAPEUTIC HORSESHOE

This application is a continuation-in-part of my copending application Ser. No. 06/619,616, filed June 11, 1984, entitled "CUSHIONED HORSESHOE", and now abandoned.

TECHNICAL FIELD

The present invention relates generally to animal husbandry products and more particularly to therapeutic shoes for horses. The predominant current usage of the therapeutic horseshoe of the present invention is in connection with horses suffering lameness or impaired performance due to "toe-in", "toe-out", navicular disease and/or laminitis (also known as "founder").

BACKGROUND ART

The horse is an animal which has changed greatly due to man's intervention in its evolution. When horses were bred for various performance characteristics other, less desirable characteristics were also inherent in the changes. Among these detrimental (at least from the standpoint of foot health) introductions are a reduction of the size of the feet of certain horse breeds and an alteration of the angle of inclination from the leg to the foot in others. Furthermore, the treatment of domestic horses has altered the manner in which the horse lives, runs, reproduces and eats. All of these changes have resulted in special problems occurring in the horse's feet.

Wild horses rarely suffer from lameness unless they are injured in some way. This is true mainly due to the fact that they constantly run on uneven ground, stand in water and otherwise are exposed to environmental factors which wear away the hoof material in the manner in which God and nature intended. Domestic horses are not so lucky. Domestic horses are exposed to much less uneven terrain and spend a great deal more time standing around than wild horses. They are protected from the more harsh and abrasive aspects of nature. Furthermore, special feeds which create other desirable conditions in domesticated horses may have a deleterious effect on the feet. Therefore, it has long been recognized that special care is required to maintain domesticated horses' feet in proper condition. Horseshoes have been the main devices used for this purpose.

A good discussion of some of the problems relating to the feet of horses may be found in the publication entitled *The Illustrated Veterinary Encyclopedia for Horsemen* put out by Equine Research Inc., 1977 edition, especially in chapter 2. As the authors point out, there is a difference between the "foot" and the "hoof". Contrary to common usage, the hoof is not a term properly applicable to the entire foot but is technically restricted to that portion which no longer constitutes living tissue. Predominantly, what most folks call the hoof wall is really the hoof and what is commonly designated the hoof is, in reality, the foot. In Applicant's earlier filed application entitled "A Cushioned Horseshoe", Ser. No. 619,616, the common nomenclature was utilized. However, although the present invention is a modification of, and closely related to, the invention disclosed in the Cushioned Horseshoe application, the more technically correct language has been adopted for the present application.

Two other publications which have dealt with the issue of lameness in horses caused by defects or injuries to the feet and hooves are the books "THE LAME HORSE, CAUSES, SYMPTOMS & TREATMENT" by Dr. James R. Rooney and "LAMENESS IN HORSES" by O. R. Adams. These references, as well as the Encyclopedia, provide a great deal of discussion of the problems encountered by horses with hoof injuries or defects. The special problems known as "toe-in" and "toe-out", which are related to foot conformation, are dealt with in the Encyclopedia at pages 39 to 42; in Rooney at page 135 and following; and in Adams at pages 404 to 410. The problem of navicular disease or damage is discussed in the Encyclopedia at pages 69 to 74; in Rooney at pages 121 to 130; and in Adams at pages 260 to 276 and 413, while that cause of lameness commonly known as laminitis or "founder" is discussed in the Encyclopedia at pages 59 to 66; in Rooney at pages 130 to 134; and in Adams at pages 247 to 259.

A further extensive discussion of navicular disease is found in an entire issue of *Equus* magazine, June 1984, a special section of which is devoted to various articles relating to the navicular bone and the maladies which affect it. An article beginning on page 48 outlines the importance of blood circulation to navicular function and illustrates the problems that occur when circulation is restricted. This article reflects the common opinion that once navicular disease becomes established it is not possible to reverse its effects.

Another useful reference which includes a good layperson's description explaining the relationship of the various elements of the horse's foot was published by *Equus Magazine* in Volume 56, pages 34 to 43. The article, entitled "Ingenious Engineering, the Secrets Behind Those Successful Steps" by Emily Kilby with Douglas Leach, PhD., deals with the manner in which a horse's foot operates and with the effect of the environment upon that operation.

From the above publications it may be understood that the bottom surface of a horse's foot includes two significant areas. The exterior rim of the hoof is a hornlike material called a "hoof wall." The hoof wall is analogous to a human fingernail. The inner portion of the bottom foot surface is more recently living material. This area, called the sole, is more analogous to the callous on a finger and is directly continuous with living soft tissue, unlike the hoof wall which has buffering connectors separating it from soft tissues. In normal running the major impact on the shod horse's foot is absorbed through the hoof wall, or horn-like portion, while the sole absorbs only a slight amount, if any, of the impact. This is particularly true on hard ground. On soft ground with an unshod horse, however, the hoof wall actually digs into the turf to a certain degree and the interior sole will directly contact the surface of the ground. This contact is important to proper operation and circulation in the hoof.

The interior of the hoof includes both bone structures and soft tissues. The lowermost bone is the coffin bone which is supported and hinged at its rearmost portions by the distal sesamoid bone, usually called the navicular bone. The deterioration of the navicular bone, caused by disease or injury, is nearly always critically crippling to the horse. Some sources indicate that the initial injury actually occurs in the tendons and cartilage associated with the navicular bone but the net result is great harm to the horse. Commonly attributed causes are improper heel height, genetic malformation and overly hard running surfaces. Navicular problems are particularly prevalent in jumping horses.

It has long been considered that shoeing horses helps to lessen the effect of impact of the foot on hard ground or such surfaces as race tracks and performance rings. Therefore, numerous developments and inventions have been made in the field of horseshoes. In many cases the object of the shoe has been to attempt to reduce the incidences of lameness.

One area of invention in the horseshoe field has specifically related to attempting to cushion the impact by the use of flexible and shock-absorbing materials as a part of the horseshoe. This has been thought to reduce the opportunity for foot injury and thereby to limit lameness.

Examples of attempts to make cushioned horseshoes are described in U.S. Pat. No. 62,867, issued to D. L. McDonell on Mar. 12, 1867; U.S. Pat. No. 308,449 issued to W. V. Wallace on Nov. 25, 1884; U.S. Pat. No. 371,789 issued to A. W. Robertson on Oct. 18, 1887; U.S. Pat. No. 546,145 issued to H. H. Gibbs on Sept. 10, 1895; U.S. Pat. No. 620,878 issued to H. E. Bauer on Mar. 14, 1899; U.S. Pat. No. 3,288,223 issued to D. Ferguson on Nov. 29, 1966; U.S. Pat. No. 3,200,885 issued to L. R. Johnson on Aug. 17, 1965; U.S. Pat. No. 3,603,402 issued to R. McDonnell on Sept. 7, 1971; and British Pat. No. 1584-339 issued to D. J. Brown on Feb. 11, 1981. Each of these references discloses a horseshoe intended to cushion the impact on the horse's hoof wall and thus improve the lifetime of the hoof.

Some attempts have also been made which provide some special support to the heel and frog portions of the hoof. These include a continuous rubber pad such as that shown in FIG. 1 of U.S. Pat. No. 1,690,365 issued to R. E. Fruin on Nov. 6, 1928 and a heel spring device such as disclosed in U.S. Pat. No. 648,236 issued to A. H. Bush on Apr. 24, 1900. However, even in these patents the frog support was merely a byproduct of ulterior purposes. Apparatus adapted to put direct pressure on the frog and the heels is shown in Adams at pages 411 and 412 (FIGS. 9-15 and 9-17). This device is used to correct problems with the frog and is not directly applicable to toe-in, toe-out, laminitis and navicular problems.

A further commercially available flexible type of horseshoe, being of a one-piece flexible plastic material, is known as the Coxton Poly-shoe. This shoe has been made the subject of U.S. Pat. No. Des. 230,234.

The prior art horseshoes have all been directed at protecting the hoof wall portion of the foot. All are directed to impact the outline of the hoof only, with some rare attention to the frog, and not to relate to the entire area of the lower surface of the foot. The forward portion of the sole, especially, has been ignored. Thus, the prior art horseshoes do not act to spread impact throughout the sole portion of the hoof as well as the hoof wall. The net result of this is that the natural impact heel spreading and circulation pumping action of the hoof is not properly enabled by prior art horseshoes. None of the prior art methods accurately reproduce the conditions of an unprotected hoof on natural terrain in conjunction with their meritorious effects on protecting the hoof wall against unnatural terrain. Furthermore the prior art attempts are not directed at reversing the damage, once it has occurred, or in providing therapeutic effects to the lame horse.

DISCLOSURE OF INVENTION

Accordingly, it is an object of the present invention to provide an improved horseshoe which distributes the pressure of the impact at least partially on the sole of the foot as well as the hoof wall.

It is another object of the present invention to provide a horseshoe which spreads a fraction of the impact evenly around the rimward portions of the sole and thus provides improved circulation within the hoof.

It is a further object of the present invention to provide a horseshoe which is adapted for aiding the rehabilitation of a lame horse.

It is still another object of the present invention to provide a therapeutic horseshoe for correcting problems caused by "toe-in" and "toe-out" conditions.

It is yet another object of the present invention to curb and reverse the effects of "founder" in horses.

It is a still further object of the present invention to reverse, and not merely prevent or alleviate, the effects of navicular disease.

This invention relates to horseshoes and more specifically to therapeutic horseshoes used to rehabilitate lameness problems in performance horses of various varieties. The therapeutic horseshoe is intended for use by veterinarians, farriers and trainers in curing and otherwise treating lameness problems. The shoe is also valuable for everyday wear as it acts to prevent problems and, possibly, improve speed.

Briefly, a preferred embodiment of the present invention is a therapeutic horseshoe particularly adapted for restoring horse's feet to normal conditions after the horse has suffered from particular problems which cause lameness. The particular problems include at least laminitis ("founder"), navicular disease and toe-in and toe-out conditions.

The overall structure of the preferred embodiment is very similar to that of the improved cushioned horseshoe of the inventor's prior application (Ser. No. 619,616). As such, the cushioned horseshoe includes an impact frame member including an insert depression on the top surface and a cushioned insert for fitting into the insert depression. The insert depression is located inward from the edge of the shoe such that the insert abuts against the sole portion of the horse's foot rather than against the hoof wall portion. Surrounding the insert depression, the upper surface of the impact frame is predominantly flat and includes support structures for both the hoof and for the heel and frog portions of the foot as well as an interior support section for the central portion of the sole. The lower surface of the impact frame includes an impact rim which will directly impact the ground whenever the foot is in position to contact the ground, a pair of opposing nail slots through which the shoe may be fastened to the hoof, a recessed plateau, situated directly under the cushioned insert and recessed somewhat from the lower surface of the impact rim, a front slope portion and a rear slope portion. The recessed plateau is adapted for contacting the ground after the impact rim has dug in slightly and the weight of the horse has caused the shoe to deform such that the recessed plateau is forced into the ground surface. The impact of the recessed plateau is conductively transferred through the shoe to the sole and improves circulation. The front slope portion permits the horse's foot to rotate and impact the ground in a particularly beneficial manner which is valuable in straightening and altering the position of the coffin bone and also in causing the strain on the navicular bone to be substantially lessened. The rear slope portion serves a similar purpose and is particularly valuable in allowing the horse to have a slightly rolling step motion, rather than the stick and lift motion which is common with ordinary shoes.

In one alternate preferred embodiment, the basic therapeutic horseshoe is altered to provide specific correction for toe-in and toe-out conditions. In this embodiment, the lower surface of the impact frame is identical to that of the basic preferred embodiment. However, the upper surface is altered by having a portion removed to cause one side of the shoe to have a greater thickness than the other. The degree of removal is dependent upon the degree of toe-in or toe-out which is necessary for correction. The upper surface remains planar but is no longer parallel to the lower surface of the shoe. This can be visualized by an inclined plane cutting through the shoe and all material above the plane being removed. The resulting imbalance causes correction of the toe-in or toe-out condition in the particular horse.

An advantage of the present invention is that it permits the horse to have a toe-pointed-downward finishing portion of a step, which permits the coffin bone to return to its proper location and thus alleviates the symptoms of founder.

Another advantage of the present invention is that the front slope and the rear slope provide a mechanism for the horse to utilize a slightly rolling step, which permits a non-destructive force increase delivered to the leg during running.

A further advantage of the present invention is that the structure of the front slope and the rear slope, combined with the central aperture arrangement, prohibits the navicular bone from receiving undue impact and shock and permits healing of navicular disease.

Another advantage of the present invention is that the smooth upper surface of the heel and frog support permits the heel portion of the foot to expand upon impact and is thus of great value in preventing contracted hoof problems.

A still further advantage of the present invention is that the construction of the shoe is such that it permits a conical force vector arrangement upon impact of the shod foot with the ground.

Yet another advantage of the present invention is that prolonged wearing of the alternate shoe can correct toe-in and toe-out problems in horses.

These and other objects and advantages of the present invention will become clear to those skilled in the art in view of the description of the best presently known mode of carrying out the invention and the industrial applicability of the preferred embodiments as described herein and as illustrated in the several figures of the drawing.

BEST MODE OF CARRYING OUT INVENTION

The best presently known mode of practicing the invention is a therapeutic horseshoe particularly characterized by being constructed in the same manner as the inventor's earlier invention of an Improved Cushioned Horseshoe, with various structural modifications being made thereto. The device is specifically adapted for reversing the damage and alleviating the symptoms of various causes of lameness which occur in the horse's foot, and particularly those of laminitis, navicular disease, toe-in and toe-out. The therapeutic horseshoe is adapted for use by any variety of horse and is amenable to long-term wear. Since the therapeutic horseshoe also aids in preventing various causes of foot injury as well as providing improved running characteristics it is desirable for use by horses which do not suffer from any foot problems whatever.

Figure 1:
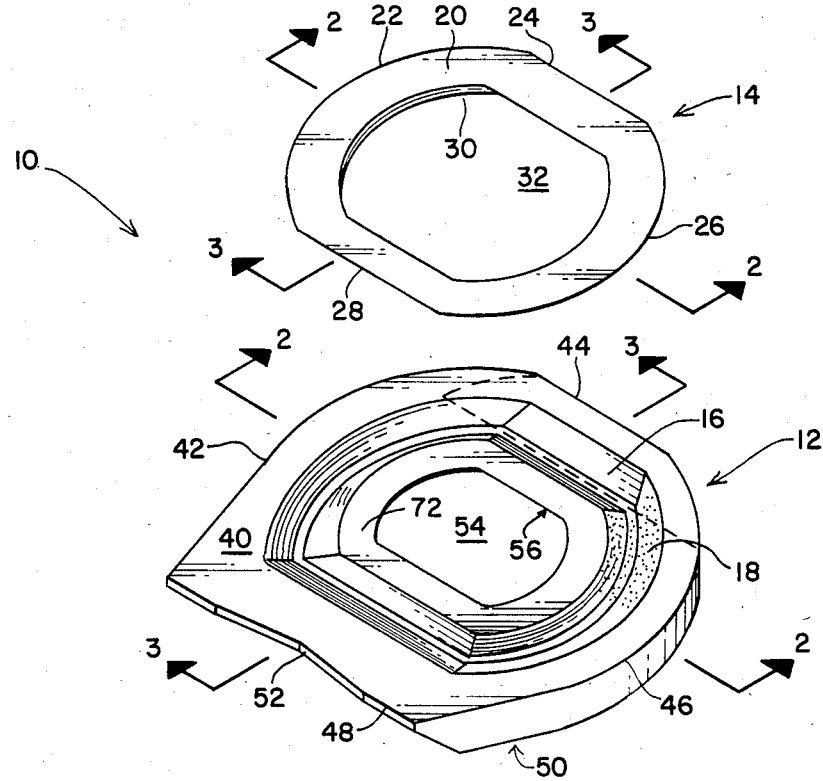
FIG. 1 is an exploded perspective view of a therapeutic horseshoe according to the present invention.

The basic version of the presently preferred embodiment of the therapeutic horseshoe is illustrated in an exploded perspective manner in FIG. 1 and is designated by the general reference character 10. The two major components of the therapeutic horseshoe 10 are an exterior impact frame 12 and a cushioned insert 14, adapted to nest within an insert depression 16 formed within the impact frame 12. In the preferred embodiment, the cushioned insert 14 is maintained within the insert depression 16 by an adhesive 18.

The relationship of the various portions of the impact frame 12 and the cushioned insert 14 may be best understood by reference to FIGS. 2, 3, 4 and 5 in addition to the exploded perspective view of FIG. 1.

All of the elements of the therapeutic horseshoe 10 exhibit symmetry about a vertical plane passing through the center of the shoe from front to back. Thus, in the basic version of the therapeutic shoe 10, each side of the shoe is equivalent to the other side.

As is shown particularly in FIGS. 1, 2, 3 and 4, the cushioned insert 14 includes an upper insert surface 20, a left side portion 22, a front portion 24, a right side portion 26, a rear portion 28 and a bottom surface 30. The cushioned insert 14 forms an enclosed loop element having a center aperture 32 in the central portion thereof.

The insert upper surface 20 is planar and is adapted to align precisely with the upper surface of the impact frame 12. The insert bottom surface 30 is shaped in the same manner as is the insert depression 16 such that the insert 14 fits snugly into the insert depression 16 and there is no slippage during ordinary usage.

Figure 2:
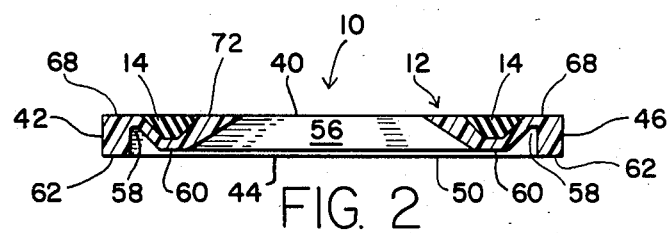
FIG. 2 is a cross-sectional view taken along line 2—2 of FIG. 1, showing the therapeutic horseshoe in a non-exploded view.
Figure 3:
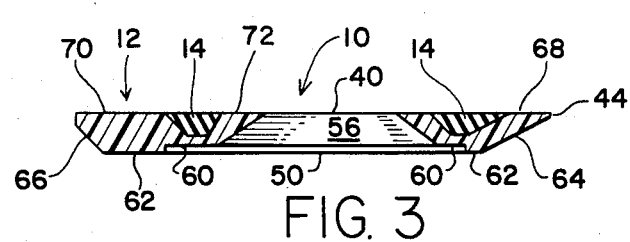
FIG. 3 is a cross-sectional view taken along line 3—3 of FIG. 1.
Figure 4:
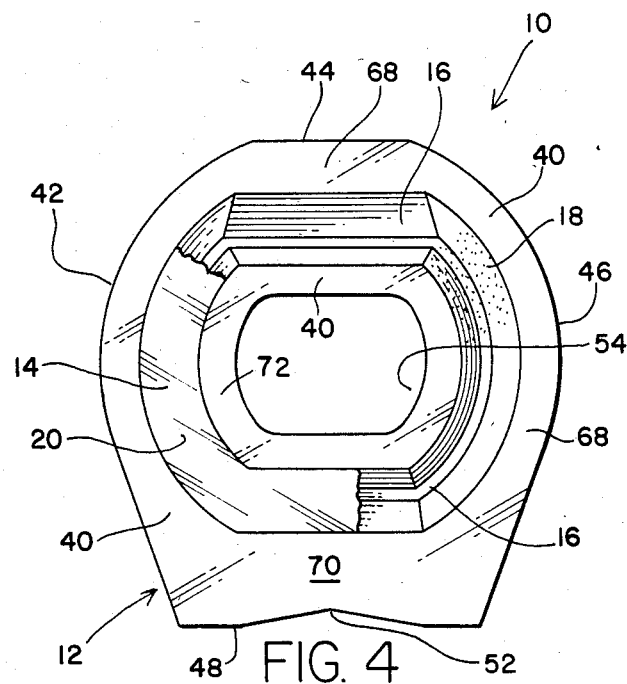
FIG. 4 is a top view of the present invention with a portion of the cushioned insert cut away.

Due to the shaping of the insert depression 16, the front or toe portion 24 is wider than the rear or heel portion 28. This is due to the fact that a greater amount of pressure is placed upon the sole of the foot near the toe, where the end of the coffin bone is situated, than in the rear, where the force is delivered to the frog and heel members rather than to the sole. The thickness of the cushioned insert 14 is uniform about its entire circumference. That is, although a lateral cross-section of the insert 14, such as is seen in FIGS. 2 and 3 shows that each portion of the insert 14 has varying depth such that it has a trapezoidal cross-section, the same total range of thicknesses applies throughout.

The cushioned insert 14 is constructed of a resilient material which will absorb a certain amount of shock but will then return some of the kinetic energy to the sole portion of the foot. A suitable material has been the plastic utilized in surgical tubing. For visual and aesthetic purposes, it is also desirable that the cushioned insert 14 be constructed to be brightly colored, both to set it apart from the impact frame 12 and also to provide an item with enhanced marketing appeal. Blue is the presently preferred color.

The impact frame 12 includes an impact frame upper surface 40, a left side portion 42, a front portion 44, a right side portion 46, a rear portion 48 and a bottom surface 50. The rear portion 48 of the impact frame 12 includes a rear indentation 52 which involves a triangular-shaped cross-section of material removed from the otherwise straight edge of the rear portion 48.

The impact frame 12 forms an enclosed loop having a center aperture 54 in the central portion thereof. As is best seen in FIGS. 2 and 3, the bottom surface 50, in the area surrounding the center aperture 54, includes a central incline 56. Because of the central incline 56, the diameter of the center aperture 54 is greater at the bottom surface 50 than at the top surface 40. One of the purposes served by the central incline 56 is that when the horse's foot impacts crumbly or soft soil a portion of the soil will be forced upward through the center aperture 54 and will impact slightly against the center portions of the sole. The force will be somewhat concentrated because the material will be urged inward by the shape of the central incline 56. This results in some impact being delivered to the center portions of the sole, which is consistent with the occurrences in an unshod horse where soft ground will impact the entire sole and not just the hoof wall.

Figure 5:
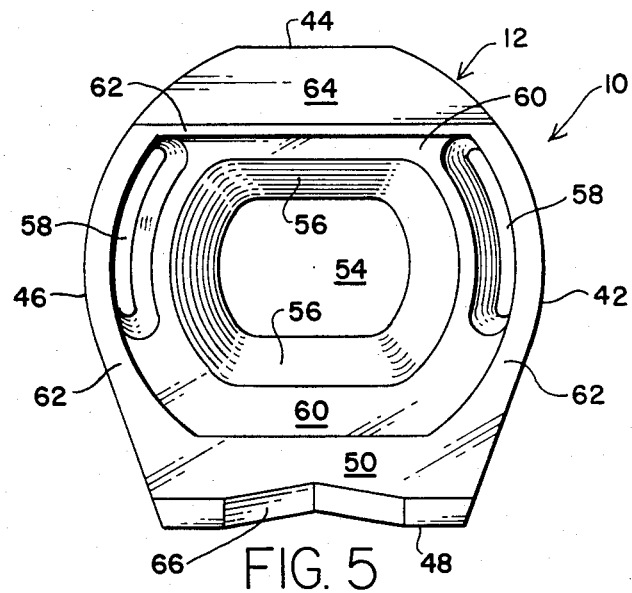
FIG. 5 is a bottom view of the therapeutic horseshoe of FIG. 1.

FIG. 5 especially illustrates the lower surface 50 of the impact frame 12. In this illustration it may be seen that, in addition to the central incline 56, the lower surface includes a pair of opposing nail slots 58 in the left portion 42 and the right portion 46, respectively. The nail slots 58 provide an area for putting nails through the shoe 10 and into the hoof wall. These nails hold the shoe 10 in position. The area surrounding the central incline 56 is formed to be a recessed plateau 60, while the outside perimeter portions of the bottom surface 50, at least on the left side 42 and the right side 46, form a traction rim 62. As can be seen from the illustrations of FIGS. 2 and 3, the traction rim 62 extends further downward than does the recessed plateau 60.

As is especially apparent from FIG. 3, the traction rim 62 is recessed inward from the front and back edges of the bottom surface 50. In this manner, the impact frame 12 is provided with a front slope portion 64 and a rear slope portion 66. The front or toe slope 64 causes the impact rim 62 in the front portion 44 of the impact frame 12 to be situated significantly rearward of the front of the foot. This results in the initial impact to the foot (in a toe-down or flat landing) occuring not at the extreme toe but rather at a point essentially opposite, although slightly rearward, of the front edge of the coffin bone. The delivery of the impact in the vicinity of the tip of the coffin bone urges the coffin bone to rotate upward such that its tip points more towards the toe and less toward the center of the foot. In this manner, the shoe 10 acts to reverse the tendency of downward rotation of the coffin bone that is a primary symptom of founder. In a healthy foot the design of the therapeutic shoe 10 also acts to prevent any downward rotation of the coffin bone and inhibits the onset of this laminitis symptom.

In addition to its therapeutic value, the front slope 64 acts to permit the foot of the horse to roll forward during a running gait. In this manner the final stages of the impact of the foot with the ground result with the toe being pointed sharply downward into the ground during the push-off stage. This is not only therapeutic in that it aligns the bones of the foot and lower leg properly, but it also acts to direct the force vector at an angle which is more greatly horizontal with respect to the ground surface than would ordinarily be achieved with a flat bottomed horseshoe. The greater the horizontal component of the force vector the greater the forward thrust delivered to the horse. In this manner the same amount of muscular force delivered by the horse will result in an increased amount of forward motion. Thus the horse will be able to run faster without any increased effort. This is particularly important in racing situations.

The rear or heel slope 66 is a much more vertical slope than the front slope 64. The purpose of the heel slope 66 is to provide for a smooth, rolling transition from the initial impact of the foot with the ground during running to the other stages of the impact. Ordinarily during running, the horse's foot will impact the ground heel first and the final stages of the step will have the force on the toe rather than the heel. The heel slope 66 permits the force vector of the initial impact to be delivered to the center of the foot rather than only to the rear portion, which is a better situation for circulation. Additionally, the heel slope permits the foot to roll forward onto the traction rim 62 in such a manner that the foot is more comfortable. The considerations relating to the heel slope 66 are similar to those found in the rounded heel portions of some human running shoes.

The upper surface 40 of the impact frame is essentially planar throughout, except in the insert depression 16. When the insert 14 is held in position within the insert depression 16 by the adhesive 18 the entire upper surface of the therapeutic horseshoe 10 is essentially flat.

The major elements of the top surface 40 are a hoof support platform 68 which encompasses the left side portion 42, the front portion 44 and the right side portion 46 of the impact frame 12, and a heel and frog support platform 70 situated in the rear portion 48. A central platform 72 is intermediate the inner border of the insert depression 16 and the center aperture 54. The central platform 72 serves to define the upper portion of the central incline 56 and to restrain the cushioned insert 14 in position and to provide some impact force to the central areas of the sole.

The hoof support platform 68 is relatively narrow and is adapted to be that portion of the therapeutic shoe 12 upon which the actual hoof wall is supported. Although the entire shoe has a degree of flexibility, the hoof support platform is relatively rigid such that a direct energy force transfer is delivered to the hoof wall from the ground during running and standing. The width of the hoof support platform 68 is selected to closely approximate the width of the hoof wall such that the entire upper surface 20 of the cushioned insert 14 abuts against the sole portion of the foot rather than the hoof wall.

That portion of the hoof support platform 68 situated in the front portion 44 is situated primarily directly above the toe slope 64. As is especially shown in FIG. 3, it may be seen that this provides that the toe portion of the hoof does not exist directly above any portion of the impact rim 62. Thus, upon a flat hoof impact with the ground, there is no direct force applied to the toe portion of the hoof. The toe impact will occur only after the foot and shoe 10 have rolled forward such that the force is being applied through the front slope 64 during the take-off portion of the step.

The heel and frog support platform 70 is broader, in radial terms, than the hoof support platform 68. In this manner a larger portion of the heel and frog are supported by the frog support platform 70. This is because the heel and frog portions of the foot are not rigid, as is the hoof wall. Since the nail slots 58 are situated significantly forward of the heel and frog support platform 70 a great amount of flexibility is permitted within the hoof at its rear portions. It is extremely important to proper circulation that the heel be permitted to expand and contract with applied and released pressure. For this reason the smooth and relatively rigid upper surface of the heel and frog support platform 70 is extremely valuable during running. Under extreme stress conditions the heel portion of the foot will impact the ground first and with a great degree of force. Once the rolling accomplished by the heel slope 66 has been completed and the force of the foot is delivered to the ground through the traction rim 62 the heel portion of the hoof will be expanded by the downward force. The smooth, rigid upper surface of the heel and frog support platform 70 greatly facilitates this expansion by providing a smooth surface upon which the portions of the heel may slide. In this manner the hoof expansion characteristics of the therapeutic horseshoe 10 represent an improvement even over the natural unshod foot. In an unshod condition the expansion of the heel is restricted in some manner by the ground itself which will naturally resist lateral expansion. With the therapeutic horseshoe 10 in place, however, the hoof is permitted to expand substantially with no additional friction or restriction introduced by the ground since the contact with the ground is maintained by the shoe 10 rather than the heel of the horse's foot.

The central platform 72, which lies radially inward from the insert depression 16, provides, to a certain degree, a resting surface for the interior portions of the horse's sole during running. Although there is ordinarily not a great degree of contact between the inner portions of the sole and the therapeutic shoe 10, under extreme pressure conditions there will be impact with the central platform 72. When this occurs the impact of the sole on the central platform 72 and the cushioned insert 14 will cause the entire shoe to deform such that the recessed plateau 60 is forced downward into contact with the ground surface. This downward force and the subsequent resilient rebound of the insert 14 and the central platform 72 against the sole simulate the unshod hoof and greatly improve the circulation characteristics.

The positioning of the center aperature 54 is selected such that it essentially surrounds the position of the navicular bone in the horse's foot. The location of the navicular bone should be directly above the middle of the center aperture 54. This is valuable in that while force is directed into the sole there is very little if any direct impact force on the portion directly beneath the navicular bone. Minimizing the shock delivered to the navicular bone is important in correcting the symptoms of navicular disease and in preventing its occurence. Navicular bone condition is also improved by the proper force delivery to the coffin bone, as was described above relating to the front slope 64. Also, the circulation enhancement described above and in greater detail in the inventor's prior application, Ser. No. 619,616, is essential in preventing and alleviating navicular disease.

Figure 6:
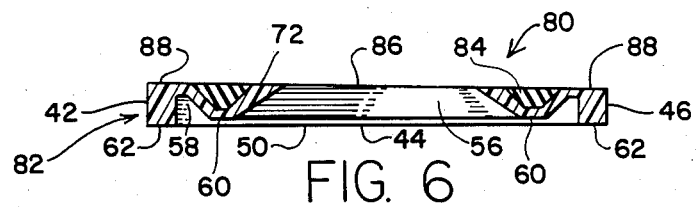
FIG. 6 is a cross-sectional view, taken along line 2—2 of FIG. 1, showing an alternate embodiment of the invention.

An alternate preferred embodiment of the therapeutic horseshoe 10 is illustrated in a cross-sectional view in FIG. 6 and is designated by the general reference character 80. This alternate preferred embodiment 80 is known as a toe-in or toe-out horseshoe. It incorporates all of the components of the preferred therapeutic horseshoe 10 but has its shape modified to specifically deal with horses that have a problem with toe-in or toe-out. The terms toe-in and toe-out are used with respect to horses that have a tendency to have one edge or the other of the hoof impact the ground first and thus the hoof wall will be worn more greatly on one side than the other. This results in the impact being unbalanced. The result of the unbalanced impact is that there is a degree of wobbling in the foot on each impact. The cumulative effect of this wobbling can be damage to the bone and ligament structures of the foot and leg. Ordinarily, toe-in and toe-out conditions, which are essentially identical to each other except for the side of the foot that hits first, are caused by internal conditions such as genetic formation of the foot and leg. However, external factors such as damage to one side of the hoof wall can also result in toe-in or toe-out. The toe-in or toe-out horseshoe 80 is specifically adapted to cause a horse suffering from toe-in or toe-out to have a balanced impact with the ground surface rather than the unbalanced impact caused by using an unmodified shoe. The toe-in, toe-out horseshoe 80 is essentially identical to the therapeutic horseshoe 10 except that all of that portion lying above a selected sloped plane is removed. The toe-in, toe-out horseshoe 80 includes an alternate impact frame 82 and an alternate insert 84. The alternate impact frame 82 has a bottom surface 50 which is identical to that of the preferred impact frame 12. However, the alternate upper surface 86 is no longer parallel to the bottom surface. Modification of the shoe 80 results in either the left side portion being shorter than the right side portion or the reverse. depending upon whether toe-in or toe-out is to be corrected and upon the location of the hoof upon which the shoe 80 is to be installed.

Assuming that the alternate toe-in, toe-out horseshoe 80 is to be installed upon a right front foot, then the shoe shown in FIG. 6 is designed to correct a toe-in problem. In this instance, the alternate upper surface 86 is sloped downward from left to right such that an alternate support platform 88 is thicker at the left portion 42 than at the right portion 46. Since the horse's hoof will be longer on the right side than on the left, the application of the toe-in, toe-out shoe 80 will cause the net effect to be a balanced flat landing surface at the bottom of the shoe. Once a flat balanced landing surface has been provided, the horse's foot and hoof structure will correct the problem over time such that eventually the toe-in, toe-out shoe will no longer be required and the standard therapeutic horseshoe 10 will be adequate.

It is noted that only the upper portions of the alternate impact frame 82 and the alternate insert are modified in changing a shoe from the preferred therapeutic horseshoe 10 to the toe-in, toe-out shoe 80. In fact, it is possible to construct a toe-in or toe-out shoe from a therapeutic horseshoe 10 by determining the degree of toe-in or toe-out on the particular horse's foot and then using a high quality slicing mechanism to modify the shoe such that it will fit. Of course, the preferred method of creating the toe-in, toe-out shoe 80 is to cast it in its final form.

Horseshoes, like shoes for human beings, come in a variety of sizes. The type of shoe worn by a Shetland Pony will differ drastically in size from that worn by a Clydesdale. Therefore, it is necessary to manufacture the shoes of the present invention in a wide variety of sizes. One typical horseshoe from the middle of the size range would have a maximum length of 12.5 cm (4.9 in), a maximum width of 12.5 cm (4.9 in), and a thickness of 1.0 cm (0.4 in). The central aperture 54 is 8 cm (3.2 in) in width at the bottom surface 50 and 6.1 cm (2.5 in) wide at the top surface 40. The nail slot will typically be 0.5 cm (0.2 in) deep, 5.5 cm (2.4 in) long and 1.1 cm (0.4 in) across with a flat bottom portion having a width of 0.3 cm (0.13 in). The recessed plateau 60 has a width of 0.4 cm (0.17 in) adjacent to the nail slots 58 and is recessed 0.16 cm (0.08 in) from the level of the traction rim 62.

On the upper surface 40, the hoof support platform 68, on either side, has a width of 1.0 cm (0.4 in) while the central support platform 72 has a width of 0.9 cm (0.35 in) on the same radius. The maximum radial width of the heel and frog support platform is approximately 2.2 cm (0.9 in) while the rear indentation 52 has a depth of approximately 0.4 cm (0.18 in).

The insert, and therefore also the insert depression 16, has an upper surface width of 1.4 cm (0.55 in) on the left side portion 22, the right side portion 26 and the rear portion 28. The upper surface 20 in the front portion 24 has a width of 2.2 cm (0.85 in). The maximum distance from the insert upper surface 20 to the insert bottom surface 30 is 0.5 cm (0.25 in). The flat portion in the center of the bottom surface 30 has a width of 0.5 cm (0.25 in).

The front slope portion 64 is set to have an angle of approximately 15° from the plane of the bottom surface 50 while the rear slope portion 66 is set at approximately a 35° angle to the plane of the bottom surface 50. The central incline 56 is selected to be angled at approximately 25° from the plane of the bottom surface 50.

The preferred therapeutic horseshoe 10 and toe-in, toe-out shoe 80 include impact frames constructed of high impact, high density polyurethane, selected to be transparent such that proper positioning and nailing is easily accomplished. The preferred material for the impact frame 12 has been found to be manufactured by the Upjohn Company and designated by them as Product No. 37506971. The cushioned insert 14 is constructed of a surgical tubing type of polyurethane. The preferred material is also manufactured by the Upjohn Company and is designated as Product No. 3507271. For show horses it is desirable for aesthetic purposes to cause the cushioned insert to be constructed of a brightly colored version of the plastic. Blue is the presently preferred color. The preferable adhesive 18 is any variety of epoxy adapted to firmly bond the cushioned insert 14 within the insert depression 16.

Particular dimensions and materials are not critical to the performance of the therapeutic horseshoe 10, so long as the approximate relationships and properties are maintained. Materials are restricted by pliability and resiliency restraints, but other than that can be freely selected from a wide variety. Furthermore, various alternate embodiments, such as the toe-in, toe-out horseshoe 80 and embodiments incorporating a free nesting insert, without an adhesive 18, are also contemplated.

Those skilled in the art will readily observe that numerous modifications and alterations may be made without departing from the spirit and scope of the present invention. Accordingly, this disclosure is not intended as limiting and the appended claims are to be interpreted as encompassing the entire scope of the invention.

INDUSTRIAL APPLICABILITY

The therapeutic horseshoe 10 of the present invention is adapted for use on the hooves and feet of horses and closely related animals. Although it is particularly intended for use in alleviating and preventing the specific problems of laminitis, navicular disease and toe-in and toe-out, its preventive functions make it particularly suitable for use on healthy feet as well.

Furthermore, the design of the front slope 64 and the rear slope 66 permits a natural rolling gait for the hoof which has a greater horizontal force vector component during the push-off stage. This can result in greater forward force being delivered by the same amount of muscular force. In the course of a race, this improvement can result in a substantial reduction of time. For this reason it is expected that the therapeutic horseshoe shall have very widespread applicability in the racing horse field.

The primary users of the present invention are expected to be horse professionals such as farriers, veterinarians and trainers. These persons are in the best position to determine the nature of the malady affecting the given horse and to utilize the corrective therapeutic horseshoe 10 in the proper manner. Since a very large number of horses, both in the United States and throughout the world, suffer from lameness problems in the nature of laminitis, navicular disease and toe-in and toe-out, it is expected that there will be a very major market for therapeutic horseshoes of this type.

For all of the above reasons it is projected that the present invention will have an extremely widespread industrial applicability and commercial viability.

I claim:

1. A plastic horseshoe comprising:

(1) a plastic frame having an upper surface for engaging a horse's hoof, a lower ground engaging surface, a front toe portion, left and right side portions and a rear heel portion, such portions being interconnected and surrounding a central opening extending through the frame from its upper surface to its lower surface, (2) said frame having an outer rim portion adapted to be nailed to the wall of a horse's hoof and having an inner portion surrounding said central opening, said inner portion having a bottom surface which is elevated above the bottom surface of the rim portion, said inner portion being formed with a recess open at the top, closed at the bottom and surrounding said central opening, and (3) a plastic insert within and filling said recess and surrounding substantially completely the central opening (4) said frame being of hard but flexible plastic material (5) said insert being of more resilient, deformable plastic providing a cushion upon impact of a horse's hoof with the ground and which will return to its original shape upon release of pressure, (6) whereby upon impact with the ground the inner portion of the frame will initially clear the ground, will then flex toward the ground and will return to its initial position when the hoof is raised from the ground, and the insert will cushion shock to the hoof and will provide a pumping action.

2. The horseshoe of claim 1 wherein the upper surface of the plastic insert is coplanar with the upper surface of the plastic frame.

3. The horseshoe of claim 1 wherein said recess in the plastic frame is tapered downwardly and said plastic insert is similarly shaped.

4. The horseshoe of claim 1 wherein the front and rear portions of the plastic frame slope inwardly and downwardly from the upper surface.

5. The horseshoe of claim 4 wherein the outer edge of the rear heel portion is indented.

6. The horseshoe of claim 1 wherein the extremity of the front toe portion is linear with respect to the left and right side portions.

* * * * *